United States Patent Office 2,798,612
Patented July 9, 1957

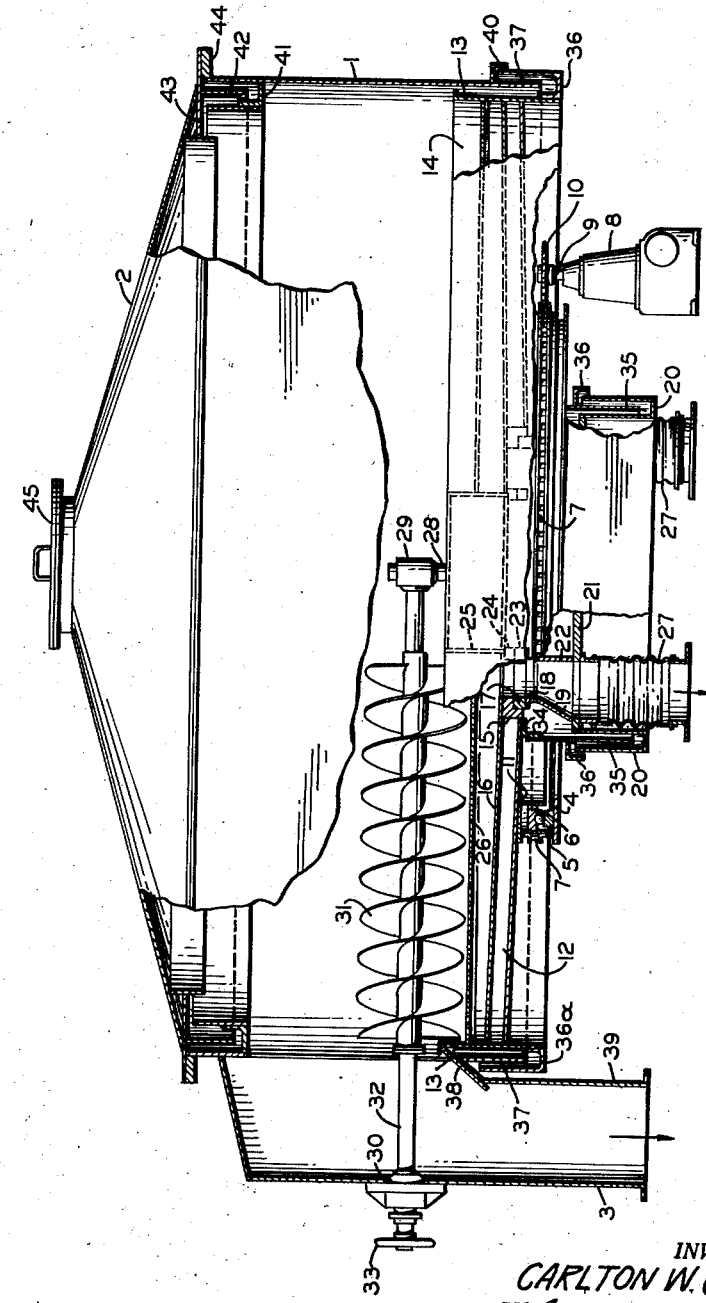

2,798,612

SEALED HORIZONTAL FILTER

Carlton W. Crumb, Oakland, Calif., assignor, by mesne assignments, to Dorr-Oliver Incorporated, Stamford, Conn., a corporation of Delaware Application September 20, 1954, Serial No. 457,099

1 Claim. (Cl. 210—393)

This invention relates to hooded continuous rotary table filters and in general has for its object the provision of fluid seals for hermetically sealing the filter shell to its cover and to the filter table, and for sealing the filter table to the stationary valve body of the automatic filter valve used for controlling the cycle of operation of the filter.

Rotary table filters sometimes designated as horizontal filters or sand filters, include an annular filter table arranged to rotate on a vertical axis and divided by radial division strips into a plurality of contiguous filter compartments. Each of these compartments is covered with a filter medium, communicates with a coaxial filter valve and constitutes an independent filter. Slurry to be filtered is fed to the top of the table and is filtered under the influence of a partial vacuum successively imposed on each of the filter compartments by the automatic filter valve as the table rotates about its vertical axis. The filtrate passes through the automatic valve either to waste or further processing, and the filter cake formed on the filter medium covering each of the filtrate compartments is continuously removed by a plow and/or scroll. Optionally the cake can be subjected to a spray wash before it is discharged from the filter, and normally such discharge is effected under the influence of a blowback or reverse pressure or at least under a zero differential pressure.

When operating these filters under certain conditions, it is desirable that they be totally enclosed and hermetically sealed. To this end the filter table is disposed within a casing or shell, a cover is placed over the casing and air and water-tight seals are made between these various parts. Presently such seals are made by bolting together any two such members with an intervening gasket. While this expedient appears to be simple, it is by no means satisfactory, for due to the nature and size of the equipment involved, the gaskets have to be very large and a great many bolts must of necessity be used.

More specifically it is the object of this invention to provide the casing of a table filter with an annular liquid trough adjacent its upper periphery for the reception of as annular skirt associated with the filter casing cover; with an annular trough formed integral with and circumscribing the filter pan for the reception of an annular skirt sealed to the lower portion of the filter casing; and with an annular trough surrounding and sealed to the stationary valve body of the automatic filter valve and arranged to receive an annular skirt sealed to and depending from the filter pan.

The invention possesses other advantageous features, some of which, with the foregoing, will be set forth at length in the following description where that form of the invention which has been selected for illustration in the drawing accompanying and forming a part of the present specification, is outlined in full. In said drawing, one form of the invention is shown, but it is to be understood that it is not limited to such form, since the invention as set forth in the claims may be embodied in other forms.

Referring to the drawing:

The single figure therein shown is a front elevation of a table filter embodying the objects of my invention with portions thereof in vertical mid-section better to illustrate its construction and operation.

As shown in this figure, the objects of my invention have been embodied in a filter comprising a generally cylindrical casing 1 having an open top, arranged to be closed by a cover 2. Formed integral with and as a part of the casing 1 is a filter cake discharge chute 3. Mounted within the lower portion of the casing 1 is a base plate 4 and supported thereon are complementary lower and upper ball races 5 and 6. Circumscribing and fastened to the outer face of the upper race 6 is a roller chain 7, and located below said chain is a motor driven speed reducer 8 including a drive shaft 9. Keyed or otherwise fastened to the shaft 9 is a sprocket wheel 10 arranged to mesh with the roller chain 7 for driving the upper race 6.

Mounted on the upper race 6 for rotation therewith is an annular pad 11 and seated thereon are a plurality of radially extending beams 12. Welded to the outer ends of these beams is the cylindrical outer wall 13 of a filter pan generally designated by the reference numeral 14. Welded or otherwise secured to the inner ends of the radial beams 12 is a first ring 15 coaxial with the casing 1 and extending from the pan wall 13 across the ring 15 and sealed thereto is an annular, dished pan bottom 16. Secured to the lower face of ring 15 is a second ring 17 rotatable with the filter pan 14 and serving as a renewable wearplate. The ring 17 is seated on the upper face of a stationary filter valve body member 18 provided with an offset annular skirt 19 terminating in an annular gutter, trough or channel 20. Welded to the skirt 19 and extending across the circular opening formed thereby is a circular plate 21, and welded to this plate is a cylindrical column 22 forming the stationary inner wall of the filter valve. Arranged above the valve wall 22 is the inner ring 23 of a wearplate coaxially disposed with respect to the outer ring 17 and secured to ring 23 is an outer ring 24 and a cylindrical column 25 serving as the inner wall of the filter pan 14. Mounted within the filter pan between its outer annular wall 13 and the column 25 is a filter grid 26. Although not illustrated, the filter pan is divided by radial partitions or division strips into a plurality of contiguous radially extending, independent filter sectors or compartments, all in accordance with well known construction and practice. Each of the filter sectors communicates through suitable ports in the pan bottom with a ported rotary valve plate rotating against a ported stationary valve member, the ports of this member being selectively connected through flexible vacuum hose sections 27 with various sources of vacuum and superatmospheric pressure depending upon the desired cycle of operation.

Supported by the column 25 coaxially therewith is an upstanding bearing post 28 and journaled on the upper end thereof is a bearing sleeve 29. Mounted on the sleeve 29 and bearing support 30, and secured to the discharge chute portion of casing 1, is a multiple flight scroll discharger conveyor 31 arranged to rotate immediately over the filter medium supported on the pan grid 26. The shaft 32 of the scroll 31 extends through the casing 1, and keyed thereto is a sprocket wheel 33 arranged to be driven by any conventional means at any desired speed. Welded to the radial beams 12 and to the first ring 15 is an annular angle 34, and secured thereto is an annular wall or skirt 35 arranged to rotate within the stationary channel or trough 20. Secured to the wall 35 is an annular shield 36 for preventing extraneous dirt from entering the channel 20.

A similar channel and cylindrical wall is provided around the outer rim of the filter pan by welding to the outer wall 13 an annular trough 36a for rotation with the filter pan. Suspended in the gutter or trough 36a coaxially therewith is a stationary cylindrical wall or skirt 37 forming an extension of the casing 1 except at the discharge chute 3 where the wall 37 is secured to an offset deflector plate 38 welded to the inner wall 39 of the discharge chute. The deflector plate 38 and an annular shield 40 are arranged to prevent discharged filter cake and extraneous dirt from entering gutter 36.

Since the construction of the filter pan 16, its driving mechanism, associated automatic valve and discharge scroll may be of any well known or more or less standard construction, it is believed that the above description thereof will suffice for the purposes of this application. Insofar as the structure so far described is concerned, the novelty therein resides in the provision of the stationary trough 20 and the rotary wall or skirt 35 associated therewith and in the rotating trough 36 and its associated skirt 37. When the channel or trough 20 is filled with water or other liquid, this construction serves as an effective liquid seal between the rotary filter pan 14 and the stationary filter valve. In a similar manner, when the trough 36 is filled with water or other liquid, this construction serves as an effective liquid seal between the rotary filter pan 14 and the stationary filter casing 1.

Formed adjacent the upper end of the casing 1 is a second annular trough or channel 41 and accommodated within this channel is a cylindrical wall or skirt 42 welded at its upper end to an annular ring 43 arranged to seat on the upper peripheral edge of the casing 1 and an annular flange 44 welded thereto. Welded to the ring 43 is an arched cover 2 provided with a central manhole, closed and sealed by a manhole cover 45.

It will, therefore, be seen that as a result of this construction, I have provided in conjunction with a horizontal type filter of standard construction three liquid seals, one for sealing the rotating portions thereof to the stationary casing, one for sealing the rotating portions of the filter pan to the stationary filter valve, and another for sealing the casing cover to the casing proper thus avoiding the customary use of costly gaskets and excessive time required for removing and replacing bolts required to seal the casing cover to the gasket and casing proper.

I claim.

A horizontal rotary table filter comprising: a sectionalized rotary filter pan member; an automatic filter valve secured to said filter pan coaxially therewith; a stationary valve body member operatively engaging said filter valve coaxially therewith; an annular trough secured to one of said members coaxially therewith; and an annular skirt secured to the other of said members coaxially therewith and depending into said annular trough.

References Cited in the file of this patent

UNITED STATES PATENTS

| | | |
|---|---|---|
| 701,687 | Desaulles | June 3, 1902 |
| 905,212 | Morrell | Dec. 1, 1908 |
| 1,007,954 | Lamb | Nov. 7, 1911 |
| 1,187,219 | With | June 13, 1916 |
| 1,826,361 | McNeal | Oct. 6, 1931 |
| 1,931,706 | Powell | Oct. 24, 1933 |
| 2,132,837 | Talbot | Oct. 11, 1938 |
| 2,246,877 | Cunningham | June 24, 1941 |
| 2,687,806 | Becker | Aug. 31, 1954 |

FOREIGN PATENTS

| | | |
|---|---|---|
| 308,727 | Germany | Oct. 29, 1918 |
| 335,872 | Germany | Apr. 18, 1921 |
| 502,904 | Germany | July 19, 1930 |
| 870,491 | France | Dec. 12, 1941 |